United States Patent [19]

Muller

[11] Patent Number: 5,410,869

[45] Date of Patent: May 2, 1995

[54] METHOD OF OPERATING A COMBINATION POWER PLANT BY COAL OR OIL GASIFICATION

[75] Inventor: Peter Muller, Otelfingen, Switzerland

[73] Assignee: ABB Management AG, Baden, Switzerland

[21] Appl. No.: 182,346

[22] Filed: Jan. 18, 1994

[30] Foreign Application Priority Data

Jan. 18, 1993 [DE] Germany .................. 43 011 00.4

[51] Int. Cl.⁶ .............................................. F02C 3/28
[52] U.S. Cl. ................................ 60/39.02; 60/39.12
[58] Field of Search ............. 60/39.02, 39.07, 39.12, 60/39.33, 39.461, 726

[56] References Cited

U.S. PATENT DOCUMENTS

| | | | |
|---|---|---|---|
| 4,019,314 | 4/1977 | Springmann. | |
| 4,250,704 | 2/1981 | Bruckner et al. | 60/39.12 |
| 4,697,413 | 10/1987 | Pohl | 60/39.12 |
| 4,785,621 | 11/1988 | Alderson et al. | 60/39.12 |
| 5,081,845 | 1/1992 | Allam et al. | 60/39.12 |

FOREIGN PATENT DOCUMENTS

| | | |
|---|---|---|
| 0212311A1 | 3/1987 | European Pat. Off. . |
| 0215330A1 | 3/1987 | European Pat. Off. . |
| 3408937A1 | 8/1985 | Germany . |
| 3738559A1 | 5/1989 | Germany . |

*Primary Examiner*—Louis J. Casaregola
*Attorney, Agent, or Firm*—Burns, Doane, Swecker & Mathis

[57] ABSTRACT

In a method for operating a combined cycle power plant with coal or oil gasification, wherein the oxygen required for gasification is supplied by an air separation plant, the air required for the air separation plant is condensed in a first, separate condenser and is cooled in a heat exchanger prior to being supplied to the air separation plant. Only enough nitrogen produced in the separation plant is supplied to the gas turbine combustion chamber as the surge limit of the compressor permits. The remaining portion of the nitrogen is expanded to ambient pressure in an expander after exiting the air separation plant.

11 Claims, 2 Drawing Sheets

METHOD OF OPERATING A COMBINATION POWER PLANT BY COAL OR OIL GASIFICATION

FIELD OF THE INVENTION

The invention relates to a method for operating a combined cycle power plant by coal or oil gasification.

BACKGROUND OF THE INVENTION

Present-day commercial gasification technologies (coal gasification, oil gasification) are based on oxygen-blown gasification reactors. The oxygen required for gasification is provided by an air separation plant. The air separation process used can be divided into the following main steps:
air compression
air cleaning with heat exchange
cryogenic rectification
compressing of the product flows to the pressure level required for the process.

Since the air separation plant operates under a pressure ratio of 6 bar, the air is compressed to 6 bar in a first partial process, while the oxygen and nitrogen product flows are produced at ambient pressure.

However, air separation plants employed in combined cycle power plants with coal or oil gasification are often designed for a higher pressure level. The gas turbine compressor is used in these cases also as the compressor for air separation, i.e. the required air is exhausted downstream of the gas turbine compressor. The air separation plant is operated at the pressure level of the gas turbine compressor, for example at 14 bar, the product gases oxygen and nitrogen are then produced at approximately 4.5 bar. The nitrogen is again compressed to the gas turbine combustion chamber pressure level, is heated in counterflow to the extraction air and is mixed with the gas from the coal or oil gasification (synthetic gas).

Because synthetic gas has high proportions of hydrogen and carbon monoxide, it must be saturated with water if it is intended to attain the required maximum $NO_x$ threshold values by means of state of the art combustion techniques.

However, when burning synthetic gas saturated with water, a problem occurs with standard gas turbines, namely that the low calorific value of the synthetic gas requires large fuel mass flows. This effect is further increased by the additional water mass flow from the combustion gas saturation. As a result, the combustion chamber pressure of standard gas turbines increases and the surge limit of the compressor is exceeded. The known solution of bleeding air from the gas turbine compressor and the integration of the gas turbine process with the air separation plant, i.e. the return of the nitrogen into the gas turbine combustion chamber, is a result thereof.

This state of the art has the following disadvantages:
low efficiency
scarce availability
low economy
no flexibility in operation.

OBJECT AND SUMMARY OF THE INVENTION

The invention attempts to avoid all these disadvantages. It has the object of providing a method for operating a combined cycle power plant with coal or oil gasification, wherein the gas turbine and the air separation plant can be operated independently of each other.

This object is attained in accordance with the invention in that the air required for the air separation plant is compressed in a separate compressor, that only as much remaining nitrogen is supplied to the gas turbine as the surge limit of the compressor permits, and the remaining portion of nitrogen is expanded to ambient pressure in an expander immediately following its exit from the air separation plant.

Among others, the advantages of the invention lie in that the gas turbine and the air separation plant are operated independently of each other and therefore the failure of the nitrogen compressor does not result in an interruption of the gas turbine operation, but only in a decrease in output. The efficiency of the installation is increased compared to the state of the art. A further advantage of the invention lies in that it is possible to select the pressure level of the air separation plant independently of the gas turbine.

It is particularly useful if the portion of the nitrogen which is supplied to the gas turbine combustion chamber is first provided with heat energy, and if the portion of the nitrogen which is guided into the expander is also supplied with heat energy. The heat sources respectively are heat from the compressor intercoolers or compressor end cooler, heat from the gasification and/or gas scrubbing process, or heat from the water-steam cycle.

It is furthermore advantageous if the nitrogen is heated in a heat exchanger upstream of the expander so that the nitrogen has a desired outlet temperature at the outlet of the expander.

Finally, the expanded nitrogen is advantageously admixed with the aspiration air for the gas turbine compressor.

It is also useful if the distribution of the nitrogen which is compressed and supplied to the gas turbine combustion chamber is controlled as a function of the surge limit and/or the ambient temperature.

It is furthermore advantageous if the operating pressure of the air separation plant is selected to be such that the nitrogen is produced at a pressure slightly higher than a combustion chamber pressure level or slightly higher than ambient pressure.

It is also advantageous to select the operating pressure independently of the combustion chamber pressure.

Two exemplary embodiments of the invention are illustrated in the drawings.

DETAILED DESCRIPTION OF THE PREFERRED EMBODIMENTS

Only the elements essential for understanding the invention are shown. The flow direction of the work media is indicated by arrows.

Figure 1:
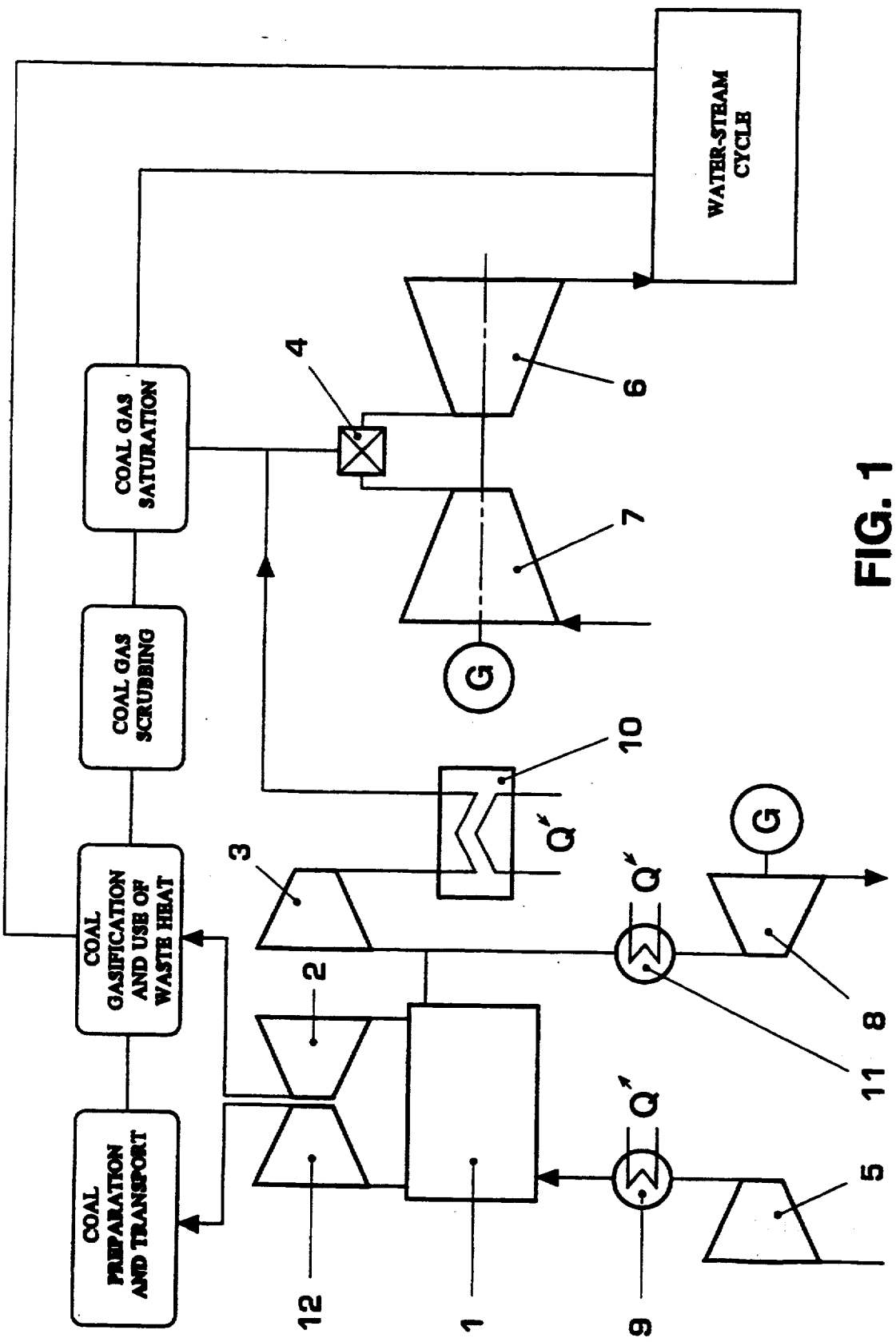
FIG. 1 is a schematic of the method of the invention for operating a combined cycle power plant operating with coal gasification without a supply of the expanded nitrogen from the air separation plant to the aspiration air of the gas turbine compressor.

The course of the method for operating a combined cycle power plant with coal gasification is schematically illustrated in FIG. 1. In this case, the following main steps occur sequentially in time:
preparation and transport of the coal
gasification of the coal and use of waste heat
coal gas scrubbing
coal gas saturation
combustion of the gas and driving of the gas turbine.

Since the presently customary gasification techniques are based on oxygen blown gasification techniques, the oxygen needed for the coal gasification is provided by means of an air separation plant 1.

In the exemplary embodiment illustrated in FIG. 1, the air required for the air separation installation 1 is compressed in accordance with the invention in a separate compressor 5. In a further step of the method, the compressed air is cooled in a heat exchanger or compressor end cooler 9 and is supplied to the air separation plant 1, which operates on the basis of the known cryogenic rectification. The oxygen produced in the process is compressed in a compressor 2, as usual, and supplied to the gasification reactors. In a known manner, a first portion of the produced nitrogen is compressed in a compressor 12 and supplied to the coal preparation process. In accordance with the instant invention, a second portion of the nitrogen is compressed in a downstream compressor 3 and supplied to the gas turbine combustion chamber 4 only to such an extent as the surge limit of the condenser 7 permits. If necessary and as shown in FIG. 1, the nitrogen is pre-heated to the desired temperature in a heat exchanger 10 prior to being admixed with the combustion gas which is supplied to the gas turbine combustion chamber 4 and burned there for driving the gas turbine 6.

The remainder of the nitrogen is expanded to ambient pressure in an expander 8. To increase the output of the expander 8 and/or to attain a desired output temperature, the nitrogen is pre-heated upstream of the expander 8 in a heat exchanger 11. Heat sources may be, for example, a compressor intercooler or compressor end cooler 9, or heat from the water-steam cycle. However, it is also possible to utilize low temperature heat from the gasification process and/or the gas scrubbing process.

It is shown in a second exemplary embodiment (FIG. 2) that, in addition to the method steps already described in connection with the first exemplary embodiment, the expanded nitrogen from the air separation plant 1 is admixed with the aspiration air of the gas turbine compressor 7. Because the expanded nitrogen is relatively cool, the aspiration air becomes cooler than the ambient temperature due to this admixture, because of which the efficiency of the installation is increased.

Figure 2:
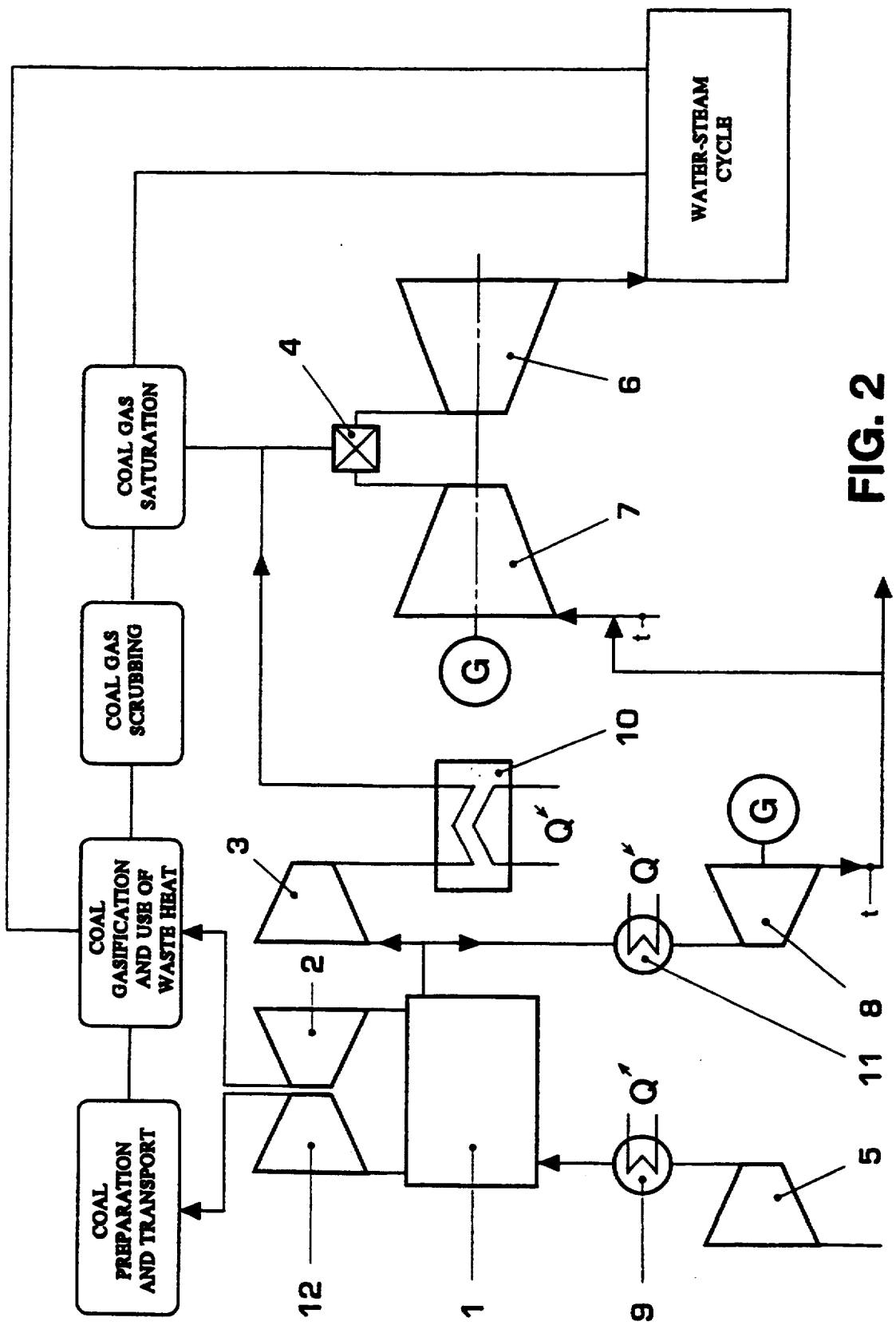
FIG. 2 is a schematic of the method of the invention for operating a combined cycle power plant operating with coal gasification with a supply of the expanded nitrogen from the air separation plant to the aspiration air of the gas turbine compressor.

It can be seen from FIG. 2 that the distribution of the nitrogen which is compressor and supplied to the gas turbine combustion chamber 4, and the nitrogen which is expanded and supplied to the aspiration air of the gas turbine compressor 7 can be controlled as a function of the surge limit and/or the temperature of the ambient air. In this way the output and efficiency of the gas turbine 6 and the entire installation become independent of the ambient temperature within a certain range.

Further exemplary embodiments of the invention ensue from the selection of the operating pressure of the air separation plant 1. The operating pressure can be selected to be independent of the level of the combustion chamber pressure. But if the operating pressure is selected in such a way that the nitrogen is produced at a pressure slightly higher than the combustion chamber pressure level, the step of compressing the nitrogen is omitted. However, if the operating pressure of the air separation plant 1 is selected such that the nitrogen is produced at a pressure slightly higher than ambient pressure, the method step of expanding the nitrogen is omitted.

It is of course possible to apply the method of the invention in combined cycle power plants with oil gasification.

The foregoing has described the preferred principles, embodiments and modes of operation of the present invention; however, the invention should not be construed as limited to the particular embodiments discussed. Instead, the above-described embodiments should be regarded as illustrative rather than restrictive, and it should be appreciated that variations, changes and equivalents may be made by others without departing from the scope of the present invention as defined by the following claims.

What is claimed is:

1. A method for operating a combined cycle power plant with coal or oil gasification, comprising the steps of:
   compressing air required for an air separation plant in a first compressor;
   cooling the compressed air in a heat exchanger prior to the compressed air being supplied to the air separation plant;
   operating the air separation plant to produce oxygen required for gasification;
   compressing the oxygen in a second compressor;
   supplying the compressed oxygen to gasification reactor;
   compressing a portion of an amount of nitrogen generated in the air separation plant in a third compressor to a pressure level of a gas turbine combustion chamber; and
   mixing the compressed nitrogen with synthetic gas produced in the gasification reactor and supplying the mixture to the gas turbine combustion chamber, wherein the portion of nitrogen supplied to the gas turbine combustion chamber is not more than a surge limit of the third compressor permits, and wherein a remaining portion of the nitrogen not compressed and supplied to the gas turbine combustion chamber is expanded to ambient pressure in an expander after it exits the air separation installation.

2. A method in accordance with claim 1, wherein the compressed nitrogen which is supplied to the gas turbine combustion chamber is first supplied with heat energy in a heat exchanger.

3. A method in accordance with claim 1, wherein the remaining portion of nitrogen is first heated in a heat exchanger before being directed into the expander.

4. A method in accordance with claim 2, wherein heat from at least one of a compressor intercooler, a compressor end cooler, the gasification process, the gas scrubbing process and a water-steam cycle is used as heat source for heating the compressed nitrogen.

5. A method in accordance with claim 3, wherein the nitrogen is heated in the heat exchanger upstream of the expander so that the nitrogen has a predetermined temperature at an outlet of the expander.

6. A method in accordance with claim 1, wherein the expanded nitrogen is admixed to aspiration air of a gas turbine compressor.

7. A method in accordance with claim 6, wherein the portion of nitrogen which is compressed and supplied to the gas turbine combustion chamber, and the remaining portion nitrogen which is expanded and supplied to the aspiration air of the gas turbine compressor are determined responsive to at least one of the surge limit and an ambient air temperature.

8. A method in accordance with claim 1, wherein an operating pressure of the air separation plant is selected so that the nitrogen is produced at a pressure slightly higher than the gas turbine combustion chamber pressure level.

9. A method in accordance with claim 1, wherein an operating pressure of the air separation plant is selected so that the nitrogen is produced at a pressure slightly higher than ambient pressure.

10. A method in accordance with claim 1, wherein an operating pressure of the air separation plant is selected independently of a combustion chamber pressure.

11. A method in accordance with claim 3, wherein heat from at least one of a compressor intercooler, a compressor end cooler, the gasification process, the gas scrubbing process and a water-steam cycle is used as heat source for heating the remaining portion of nitrogen.

* * * * *